United States Patent
Boone

(10) Patent No.: US 7,004,362 B2
(45) Date of Patent: Feb. 28, 2006

(54) METHOD AND APPARATUS FOR CARRYING A CAR SEAT

(76) Inventor: Brian T. Boone, 630 Emporia Rd., Boulder, CO (US) 80305

( * ) Notice: Subject to any disclaimer, the term of this patent is extended or adjusted under 35 U.S.C. 154(b) by 0 days.

(21) Appl. No.: 10/309,085

(22) Filed: Dec. 4, 2002

(65) Prior Publication Data

US 2003/0106916 A1 Jun. 12, 2003

Related U.S. Application Data

(60) Provisional application No. 60/336,631, filed on Dec. 7, 2001.

(51) Int. Cl.
A45F 3/04 (2006.01)

(52) U.S. Cl. ............. 224/161; 224/259; 224/261; 224/628; 224/637

(58) Field of Classification Search ............ 224/159, 224/160, 161, 250, 259, 261, 262, 272, 627, 224/628, 637, 650, 651, 907; 297/250.1, 297/254, 255, 256, 256.17
See application file for complete search history.

(56) References Cited

U.S. PATENT DOCUMENTS

| | | | |
|---|---|---|---|
| 3,260,428 A | 7/1966 | Mack | |
| 3,421,670 A | 1/1969 | Hansson | |
| 3,690,525 A | 9/1972 | Koons | |
| 3,713,568 A | 1/1973 | Sloan | |
| 3,799,414 A | 3/1974 | Fiffer | |
| 3,984,115 A | 10/1976 | Miller | |
| 4,009,808 A | 3/1977 | Sharp | |
| 4,040,548 A * | 8/1977 | Guglielmo | 224/262 |
| 4,157,837 A | 6/1979 | Kao | |
| 4,271,998 A | 6/1981 | Ruggiano | |
| 4,333,591 A | 6/1982 | Case | |
| 4,416,403 A | 11/1983 | Johnson | |
| 4,620,711 A | 11/1986 | Dick | |
| 4,746,044 A | 5/1988 | Arvizu et al. | |
| 4,747,526 A | 5/1988 | Launes | |
| 4,762,256 A | 8/1988 | Whitaker | |
| 4,915,401 A | 4/1990 | Severson et al. | |
| 4,938,400 A | 7/1990 | Springston | |
| 5,020,709 A | 6/1991 | Hoaglan | |
| 5,046,651 A | 9/1991 | Dagdagan | |
| 5,178,309 A * | 1/1993 | Bicheler et al. | 224/160 |
| 5,297,708 A * | 3/1994 | Carpenter | 224/651 |
| 5,431,478 A | 7/1995 | Noonan | |
| 5,527,089 A | 6/1996 | Charest | |
| 5,579,966 A * | 12/1996 | Krumweide et al. | 224/637 |

(Continued)

OTHER PUBLICATIONS

Ultimate Car Seat/Booster Seat Carrier for Protection and Carrying Convenience; JL Childress Car Seat/Booster Seat Carrier for Your On-The-Go Needs; http://shop.store.yahoo-.com/kidstuff/g137-seatcarrier.html, Sep. 12, 2002.

(Continued)

Primary Examiner—Gary E. Elkins
(74) Attorney, Agent, or Firm—Intelle Tech PLLC; Katharine I. Matthews

(57) ABSTRACT

An apparatus for carrying a car seat such as an infant car seat, child car seat, or a child booster seat is disclosed. The apparatus includes a carrier body and at least one system of harnesses for attaching to the car seat, and for securing the apparatus on a person's back, chest, or side, leaving the person's hands free. The system of harnesses may include an upper harness system, a middle harness system, a lower harness system, a shoulder harness system, and a hip harness system. The apparatus permits a person to carry the car seat together with a child secured in the car seat.

11 Claims, 5 Drawing Sheets

U.S. PATENT DOCUMENTS

| | | | |
|---|---|---|---|
| 5,607,089 | A | 3/1997 | Strum |
| 5,609,279 | A | 3/1997 | O'Shea |
| 5,626,271 | A | 5/1997 | Messey et al. |
| 5,634,576 | A * | 6/1997 | Arbel .......................... 224/637 |
| 5,662,339 | A | 9/1997 | Svendsen et al. |
| 5,779,248 | A | 7/1998 | Gold et al. |
| 5,868,462 | A * | 2/1999 | Truax .......................... 224/261 |
| 5,918,785 | A * | 7/1999 | Irose .......................... 224/259 |
| 5,957,355 | A * | 9/1999 | Swetish ....................... 224/627 |
| 5,964,470 | A | 10/1999 | Syendsen et al. |
| 6,073,820 | A | 6/2000 | Drobinski |
| 6,092,543 | A | 7/2000 | Roh |
| 6,098,857 | A | 8/2000 | Le Gal |
| 6,155,579 | A | 12/2000 | Eyman et al. |
| 6,158,641 | A | 12/2000 | Eyman et al. |
| 6,196,437 | B1 * | 3/2001 | Smith, III ................... 224/628 |
| 6,283,347 | B1 | 9/2001 | Roh |
| 6,318,608 | B1 | 11/2001 | Fowler et al. |

OTHER PUBLICATIONS

The Ultimate Car Seat/Booster Seat Carrier by J.L. Childress; http://www.babysupermall.com/main/products/jlc/jlc02100.html, Sep. 12, 2002.

Car Seat Travel Bag by Graco; http://store.babycenter.com/product/gear/car_seat_toys/2031, Nov. 15, 2002.

Child Safety Seats, Car Seats, Booster Seats: Safeline Sit 'n Stroll; http://www.familyonboard.com/Sit_n_Stroll_car_seat.html, Nov. 15, 2002.

* cited by examiner

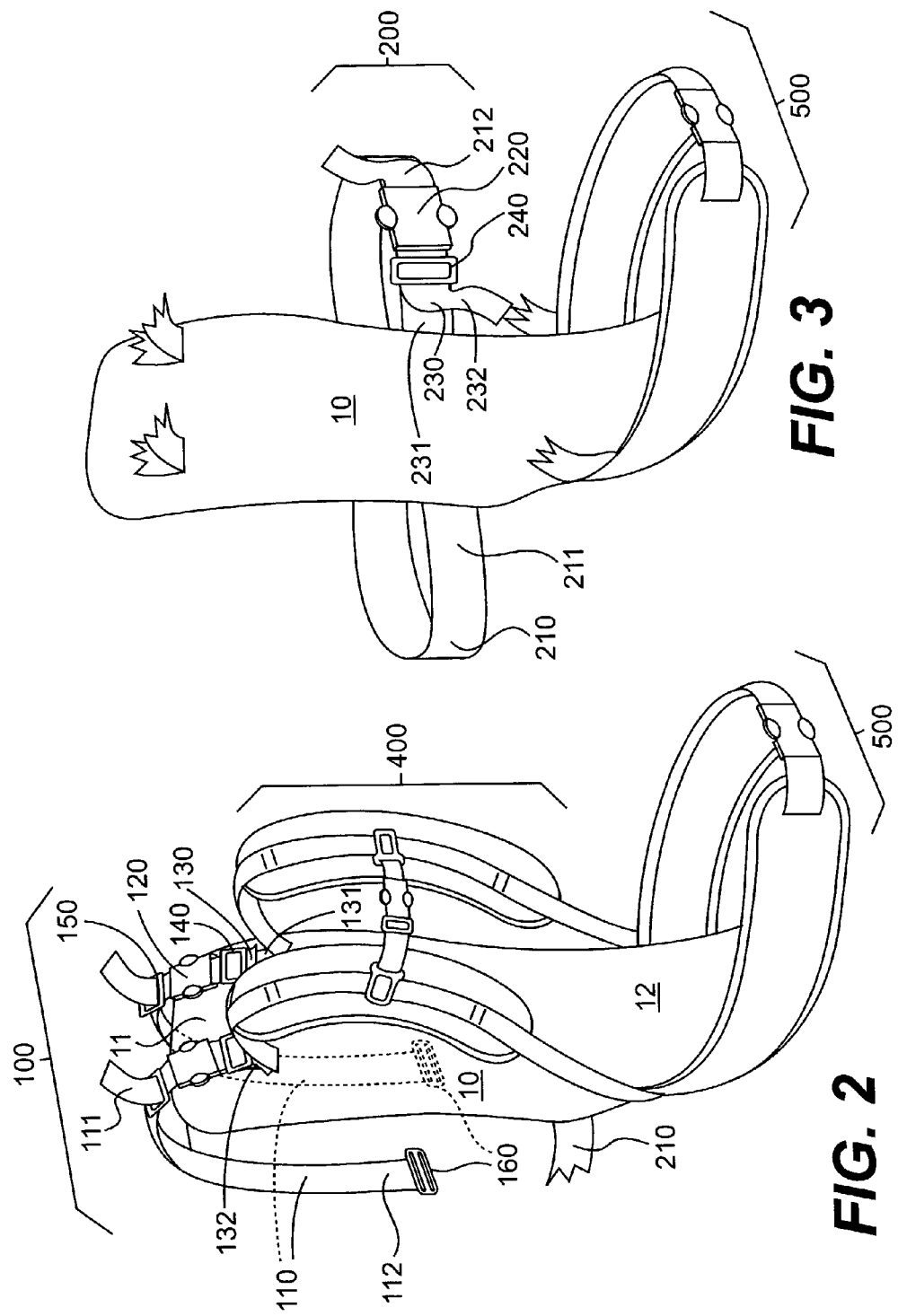

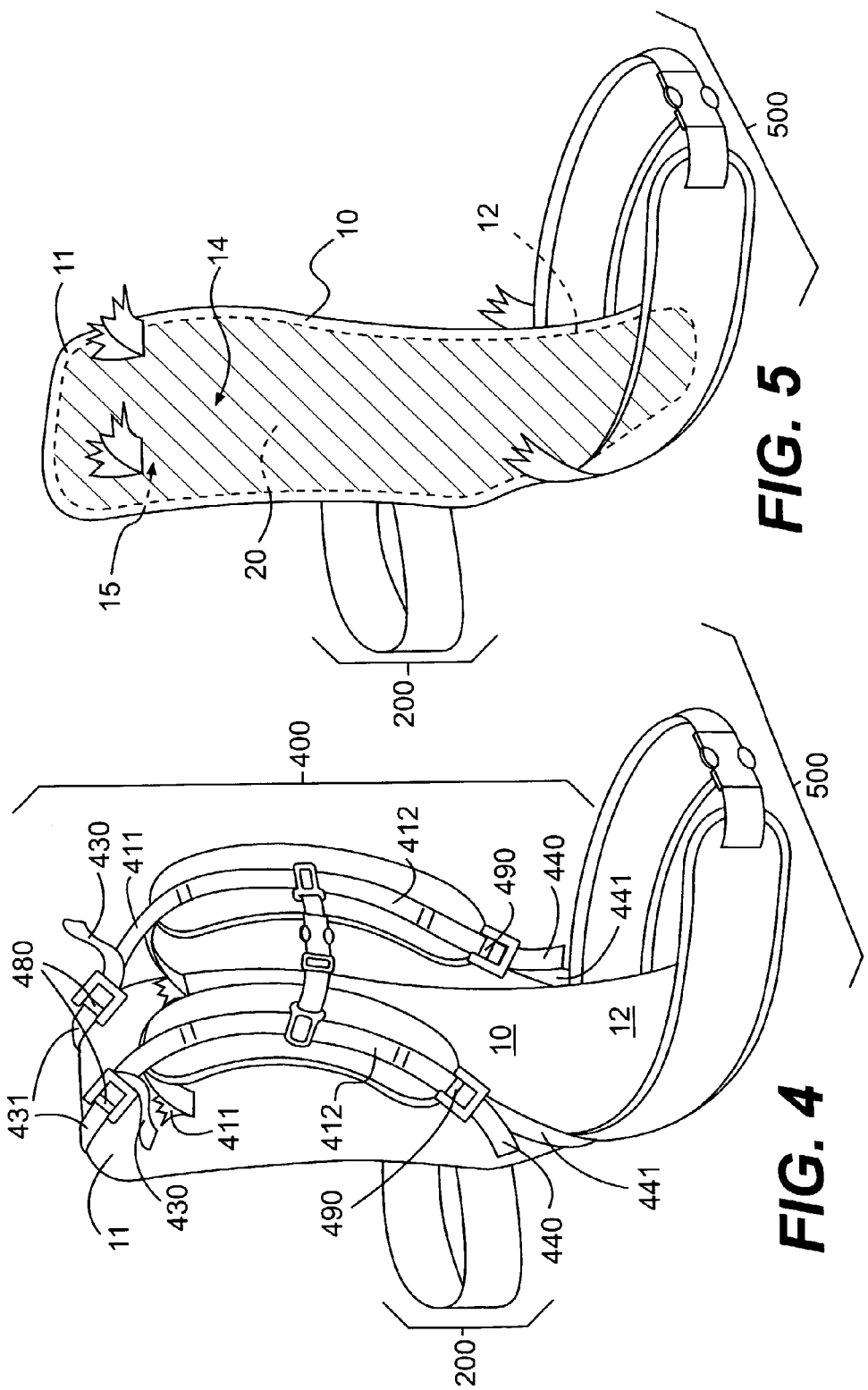

METHOD AND APPARATUS FOR CARRYING A CAR SEAT

CROSS-REFERENCE TO RELATED APPLICATION

This application relates to and claims priority on prior U.S. Provisional Application Ser. No. 60/336,631, filed on Dec. 7, 2001 and entitled "Method and Apparatus for Carrying an Infant's or Child's Car Seat on an Individuals Back with or without a Child in the Car Seat."

FIELD OF THE INVENTION

The present invention relates to carrying a car seat such as an infant car seat, child car seat, or a child booster seat. In particular, the invention relates to a system of harnesses for carrying a car seat on a person's back, chest, or side, leaving the person's hands free. The present invention also permits a person to carry a car seat together with a child secured in the car seat.

BACKGROUND OF THE INVENTION

The use of car seats for the safe restraint of infants and children in vehicles is well known. For the safety and comfort of an infant or child, and also to comply with applicable laws requiring the use of car seats for children of specified ages, car seats now are commonly removed from the family vehicle and taken along on travels. For example, a child's car seat may be used for the child in a rental car on the family vacation. In addition, car seats commonly may be used in other modes of transportation, such as airplanes, busses, boats, or trains, to provide a safer and more comfortable seat for young children.

Such use of car seats away from the family vehicle thus requires the transport of the car seats through airport terminals, bus stations, train stations, boat terminals, and the like. The typical infant or child car seat is quite bulky, of an awkward shape, and may weigh between ten and twenty pounds. Thus the physical size, structure, and weight of the car seat make it difficult to carry and for most persons, require the use of both hands. This is particularly necessary if the car seat is carried for a substantial distance.

Various devices have been developed to assist with the transport of car seats, including a wide variety of bags, totes, and cases. Typically these travel bags comprise a zippered sack, with a handle and/or shoulder strap. The car seat may be placed in the sack and then carried from the family vehicle to baggage check, or onto the airplane, bus, etc.

Alternatively, some models of car seats are provided with wheels and a handle, essentially converting the car seat into a stroller so that it can be wheeled through an airport or other area. In addition, stroller-type attachments are made for car seats, again converting the car seat to a stroller-like apparatus that can be wheeled to its destination.

Typically, a child young enough to require the use of a car seat is also too young to walk any considerable distance through an airport terminal, train station, etc. This generally requires that the child also be carried, typically in a stroller, a backpack or front carrier, or simply in the guardian's arms. In addition, travel with young children generally entails transporting various other equipment, such as diaper bags. As a result, persons transporting young children while traveling must potentially negotiate a number of large, awkward items, in addition to the child.

The devices described above, although designed to transport car seats, nonetheless have a number of disadvantages and limitations. For example, even when encased in the travel bag type of carrier, a car seat may be quite cumbersome to carry, often banging against the leg of the person carrying it. Furthermore, it is not possible to carry a child strapped in the car seat when the car seat is encased in this type of travel bag, so the child typically must be carried in addition to the car seat, or placed in a stroller or other carrying device. This is particularly challenging for a single adult traveling with a child.

Car seats that are capable of being converted to stroller-like apparatuses do permit the carrying of the child in the car seat, but require the transporting person to use his or her hands to wheel the car seat/stroller. In the case of stroller-type attachments, these must be detached and stored once the car seat is placed in the airplane, rental car or other seat.

The present invention comprises several systems of harnesses and straps that may be attached to a car seat, so that the car seat may then be carried on a person's back, chest, or side. The harness systems of the present invention need not be removed when the car seat is placed in its destination seat in a vehicle, airplane, train, etc. Instead, the present invention permits the car seat to be securely fastened into a vehicle or other seat, using a conventional safety or seat belt restraint, while the harness systems remain attached to the car seat.

In addition to features designed for convenience, the present invention optimizes load-carrying efficiency and comfort for the user. The harness systems of the present invention are attached to a fabric carrier body that is provided with an internal semi-rigid back pad. The back pad, or stiffening member, may also be provided with shaped, semi-rigid aluminum stays. This semi-rigid body frame provides a contoured platform that supports the load of the car seat, or car seat plus child, and effectively distributes the load over a large area of the user's back. The carrier body may also be provided with a mesh aerospacer fabric for comfort. The design of the present invention thus avoids single points of excessive pressure on the user's back.

The semi-rigid body frame also provides a means of attachment for the harnesses such that the harnesses and points of attachment remain stationary as the user carries the car seat, or car seat plus child. In addition, the carrier body provides attachment points for a chest strap, multiple adjustment straps for optimizing the fit of the carrier to the user, and an adjustable hip belt. Attachment of the harness systems and adjustable straps to the semi-rigid carrier body permits the user to shift the load and position of the load in order to optimize stability and comfort.

The present invention thus overcomes limitations of the known devices in that it permits the user to carry the car seat without the use of his or her hands. The person's hands are thus free to carry other baggage or equipment, or the child, if desired. In addition, the transporting person may also carry the infant or child securely strapped into the car seat. Thus a further benefit of the present invention is that its use obviates the need for an additional stroller, backpack or front carrier to carry the child, reducing the amount of paraphernalia otherwise required to travel with a young child. Because the harness systems of the present invention need not be removed for the car seat to be secured in a vehicle or other seat, there is no additional equipment to detach, fold, or stow away.

Further, Applicant has designed the present invention to be useable with any commercially available car seat, by virtue of having certain of the harness systems available in a multiplicity of sizes and configurations. For example, the load lifter adjustment straps may be provided with attachment mechanism of varying thickness, in order to fit in car seat slots of different sizes. The user may "mix and match" components of the apparatus, to choose the combination of harness systems that best fits a particular model of car seat.

Additional objects and advantages of the invention are set forth, in part, in the description which follows and, in part, will be apparent to one of ordinary skill in the art from the description and/or from the practice of the invention.

SUMMARY OF THE INVENTION

In response to the foregoing challenge, Applicant has developed an innovative and efficient system of harnesses for carrying a car seat. As illustrated in the accompanying drawings and disclosed in the accompanying claims, the invention is an apparatus for carrying a car seat by a person, comprising a carrier body having an upper end and a lower end, and at least one harness system attached to the carrier body, for attaching the carrier body to the car seat and to the person. The at least one harness system may further comprise a shoulder harness system attached to the carrier body at the upper end and at the lower end, for securing the apparatus to the person. The at least one harness system may further comprise a middle harness system attached to the carrier body between the upper end and the lower end, for attaching the carrier body to the car seat. The at least one harness system may further comprise a hip harness system attached to the carrier body at the lower end, for further securing the apparatus to the person. And, the at least one harness system may further comprise an upper harness system attached to the carrier body at the upper end, for further attaching the carrier body to the car seat.

The upper harness system of the present invention may further comprise at least one load lifter adjustment strap, having a first end and a second end, attached to the carrier body at the upper end. The first end of the load lifter adjustment strap may further comprise a first releasable attachment mechanism for attaching to and detaching from the carrier body, and the second end may further comprise an attachment mechanism for attaching to the car seat. Additionally, the first end of the at least one load lifter adjustment strap may further comprise a first fixed attachment strap having a first end and a second end, wherein the first end is attached to the carrier body and to a first adjustment mechanism, and the second end is adjustable by means of the first adjustment mechanism; and a second adjustment mechanism attached to the first end, for adjusting the length of the at least one load lifter adjustment strap.

The middle harness system of the present invention may further comprise a middle attachment strap having a first end and a second end, for attaching the carrier body to the car seat, wherein the first end is attached to the carrier body and the second end is attached to a second releasable attachment mechanism, and a second fixed attachment strap having a first end and a second end, wherein the first end is attached to the carrier body and the second end is attached to a third adjustment mechanism for adjusting the length of the middle harness system and thereby securing the carrier body to the car seat.

The shoulder harness system of the present invention may further comprise at least one shoulder strap having an upper end and a lower end, for securing the apparatus to the person, wherein the upper end is attached to the upper end of the carrier body and the lower end is attached to the lower end of the carrier body; and at least one shoulder pad attached to the at least one shoulder strap. The at least one shoulder strap may further comprise a first shoulder strap having an upper end and a lower end; and a second shoulder strap having an upper end and a lower end.

The shoulder harness system may further comprise a chest strap having a first end and a second end, the first end attached to the first shoulder strap between the upper end and the lower end of the first shoulder strap by one of a fourth adjustment mechanism, and the second end attached to the second shoulder strap between the upper end and the lower end of the second shoulder strap by another of the fourth adjustment mechanism, wherein the first and second ends are attached to a third releasable attachment mechanism. This permits the chest strap to be adjustable along the first and second shoulder straps by means of the fourth adjustment mechanisms, and to open and close by means of the third releasable attachment mechanism;

The upper end of the at least one shoulder strap may further comprise an upper shoulder harness attachment strap attached to the upper end of the carrier body and to a fifth adjustment mechanism, and an upper shoulder harness adjustment strap attached to the fifth adjustment mechanism. The lower end of the at least one shoulder strap may further comprise a lower shoulder harness attachment strap attached to the lower end of the carrier body and to a sixth adjustment mechanism, and a lower shoulder harness adjustment strap attached to the sixth adjustment mechanism. This permits the length of the at least one shoulder strap to be adjustable by means of the upper and lower shoulder harness adjustment straps.

The hip harness system of the present invention may further comprise a hip belt having a first end and a second end, wherein the first end is attached to the carrier body and the second end is attached to a fourth releasable attachment mechanism, thereby securing the apparatus to the person. The hip belt may open and close by means of the fourth releasable attachment mechanism. The hip harness system may further comprise a hip belt adjustment strap attached to the second end of the hip belt and to the fourth releasable attachment mechanism, for adjusting the length of the hip belt.

The carrier body of the present invention may further comprise a front panel facing toward the person and a back panel facing toward the car seat, wherein the front panel and the back panel are attached to one another to form a pocket. The carrier body may further comprise a stiffening member shaped to fit inside the pocket, for providing support for the carrier body; and at least one semi-rigid stay attached to the stiffening member, for providing additional support for the carrier body. The carrier body may further comprise at least one pouch attached to the stiffening member, having an opening, wherein the at least one semi-rigid stay is inserted into the opening of the pouch.

The apparatus of the present invention may be integrated into a factory design of the car seat, or may be an aftermarket product separately available for attachment to the car seat.

The at least one harness system may further comprise a lower harness system attached to the carrier body at the lower end, wherein the lower harness system further comprises at least one attachment strap for securing the car seat to the carrier body.

Applicant further discloses an apparatus for carrying a car seat by a person, the apparatus comprising means for attaching the car seat to the person, and means for supporting the attachment means.

The attachment means of the present invention may further comprise means for attaching the supporting means to the car seat at an upper area of the car seat; means for attaching the supporting means to the car seat at a middle area of the car seat; means for securing the supporting means to the person at a shoulder region of the person; and means for securing the supporting means to the person at a hip region of the person. The attachment means may further comprise means for attaching the supporting means to the car seat at a lower area of the car seat.

The apparatus of the present invention may be designed such that the upper attachment means is integrated into a factory design of the car seat, or that the middle attachment means is integrated into a factory design of the car seat, or that the shoulder securing means is integrated into a factory design of the car seat, or that the hip securing means is integrated into a factory design of the car seat.

Applicant further discloses a method for carrying a car seat by a person, comprising the steps of providing at least one harness system for attaching the car seat to the person; and providing a carrier body, having an upper end and a lower end, for supporting the at least one harness system.

The method of the present invention may further comprise the steps of providing an upper harness system attached to the carrier body at the upper end; providing a middle harness system attached to the carrier body between the upper end and the lower end; providing a shoulder harness system attached to the carrier body at the upper end and the lower end; and providing a hip harness system attached to the carrier body at the lower end.

The method of the present invention may further comprise the step of providing a lower harness system attached to the carrier body at the lower end.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention and, together with the detailed description, serve to explain the principles of the present invention.

BRIEF DESCRIPTION OF THE DRAWINGS

FIG. 2 is a perspective view of an apparatus for carrying a car seat, having additional adjustment capability for an upper harness system, according to an embodiment of the present invention.

FIG. 3 is a perspective view of a middle harness system of an apparatus for carrying a car seat according to an embodiment of the present invention.

FIG. 4 is a perspective view of an apparatus for carrying a car seat, having additional adjustment capability for an upper shoulder harness adjustment strap and a lower shoulder harness adjustment strap, according to an embodiment of the present invention.

FIG. 5 is a perspective view of an apparatus for carrying a car seat, having an internal stiffening member, according to an embodiment of the present invention.

DETAILED DESCRIPTION OF THE INVENTION

Figure 1:
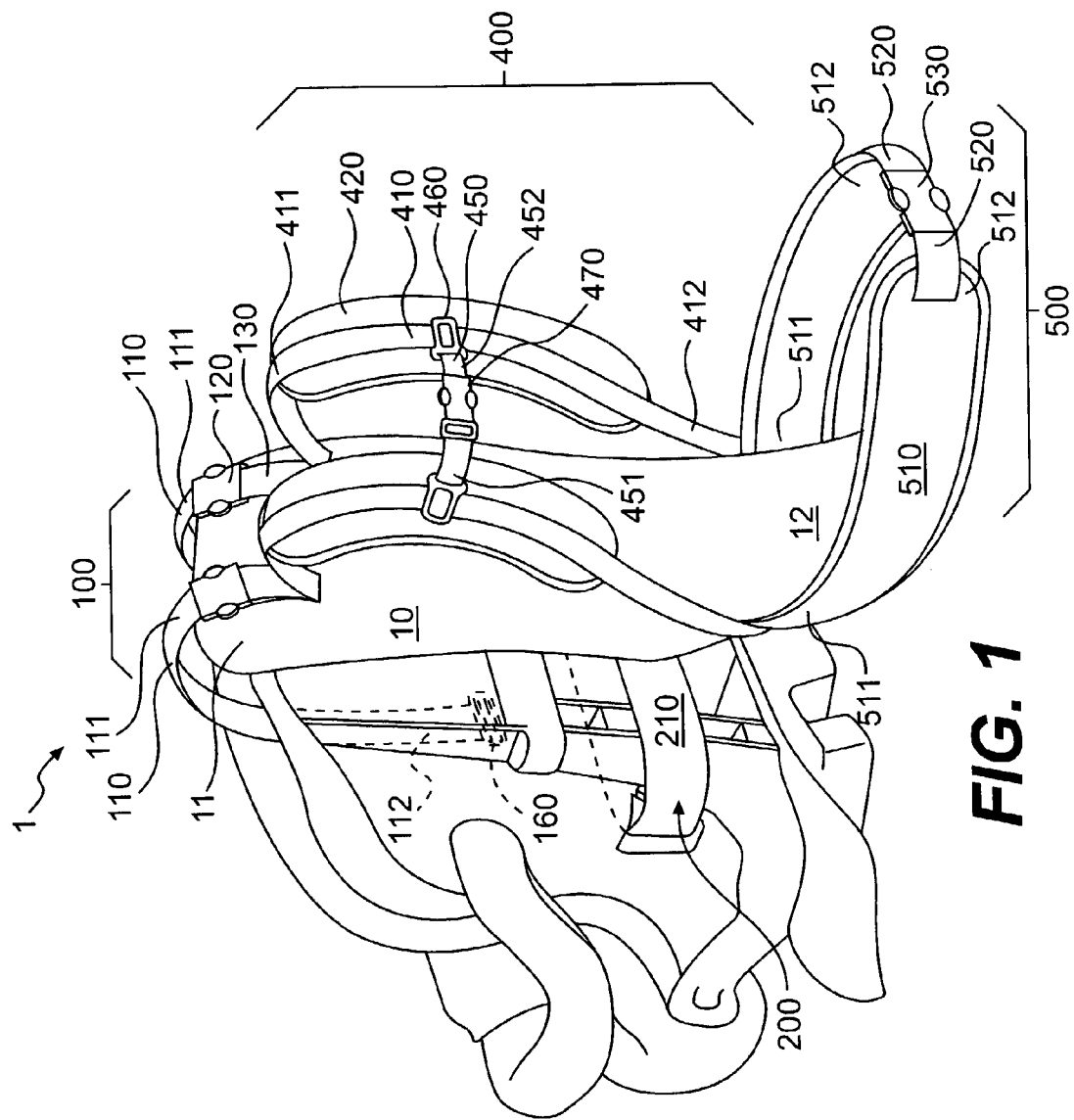
FIG. 1 is a perspective view of an apparatus for carrying a car seat according to an embodiment of the present invention.
Figure 7:
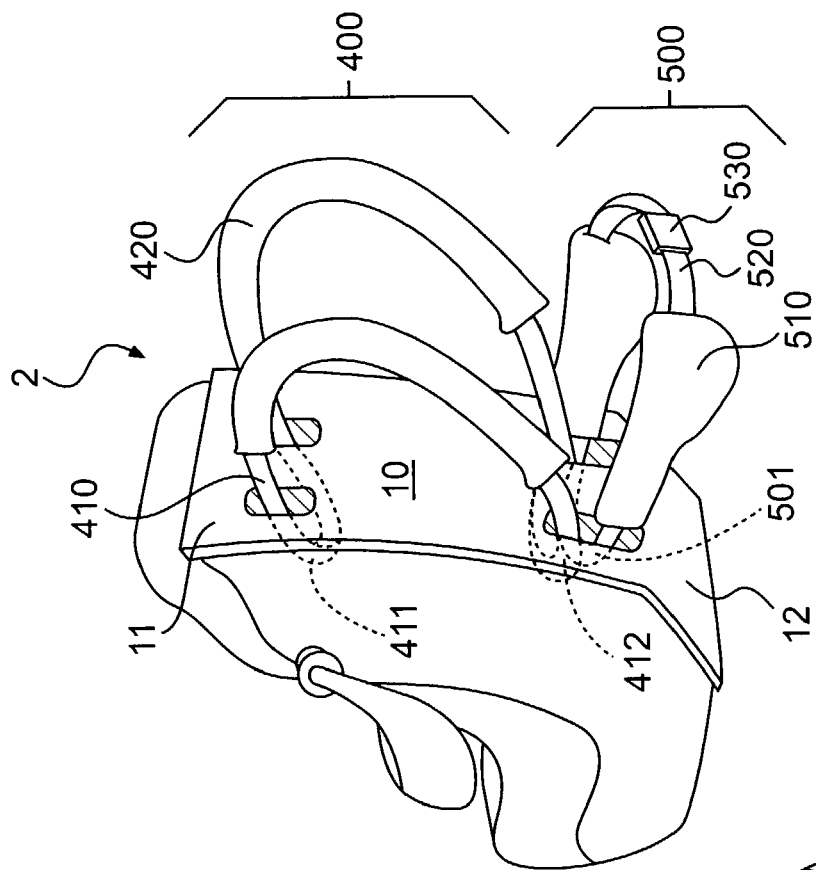
FIG. 7 is a perspective view of an apparatus for carrying a car seat according to an alternate embodiment of the present invention.

Referring now to FIG. 1, a preferred embodiment of the present invention is shown as carrier apparatus 1. Carrier apparatus 1 preferably comprises carrier body 10, upper harness system 100, middle harness system 200, shoulder harness system 400 and hip harness system 500. Carrier body 10 may be fabricated from any of a variety of materials that provide adequate strength and flexibility to support the load of a car seat, or car seat together with an infant or child. Examples include various types of nylon cordura cloth, polyester duck, nylon pack cloth, or other suitable materials. Upper harness system 100, middle harness system 200, shoulder harness system 400 and hip harness system 500 may be fabricated from any of a variety of straps and padding materials that provide adequate strength and flexibility to support the load of a car seat, or car seat together with an infant or child. Examples include nylon webbing, polypropylene webbing, nylike webbing or other suitable materials. Such materials are well known and are readily available in a variety of sizes and configurations.

Upper harness system 100 together with middle harness system 200 serve to attach carrier body 10 to a child's or infant's car seat. Shoulder harness system 400 together with hip harness system 500 preferably attach carrier body 10 to a user.

Upper harness system 100 preferably further comprises load lifter adjustment strap 110, having a first end 111 and a second end 112. Load lifter adjustment strap 110 preferably is attached to first releasable attachment mechanism 120 at load lifter adjustment strap first end 111. First releasable attachment mechanism 120 may be any suitable mechanism that permits load lifter adjustment straps 110 to be attached and released without slipping or accidental release. Examples of suitable mechanisms include side release type buckles and hook-and-loop closures, however, the present invention is not limited to these mechanisms. As embodied herein, carrier apparatus 1 preferably comprises two load lifter adjustment straps 110, attached symmetrically at upper end 11 of carrier body 10 by two first releasable attachment mechanisms 120.

First releasable attachment mechanism 120 may be attached to carrier body 10 by first fixed attachment strap 130, as shown in FIG. 1. In this embodiment, first attachment strap 130 is a fixed length, sewn or otherwise attached to carrier body 10.

Alternatively, first releasable attachment mechanism 120 may be attached to carrier body 10 by first fixed attachment strap 130 in conjunction with first adjustment mechanism 140, as shown in FIG. 2. In this embodiment, first fixed attachment strap 130 further comprises first end 131 and second end 132. First end 131 of first fixed attachment strap 130 preferably is sewn or otherwise attached to carrier body 10. Second end 132 of first fixed attachment strap 130 preferably is fed through first adjustment mechanism 140, such that first fixed attachment strap 130 can be lengthened or shortened. First adjustment mechanism 140 may be any suitable mechanism that permits first fixed attachment strap 130 to be shortened and lengthened without slipping or accidental release. Examples of suitable mechanisms include tri glide type buckles and hook-and-loop closures, however, the present invention is not limited to these mechanisms.

Load lifter adjustment strap 110, at first end 111, may alternatively be provided with second adjustment mechanism 150, as shown in FIG. 2. Second adjustment mechanism 150 is attached to first releasable attachment mechanism 120. Second adjustment mechanism 150 may be any suitable mechanism that permits load lifter adjustment straps 110 to be shortened and lengthened without slipping or accidental release. Examples of suitable mechanisms include tri glide type buckles and hook-and-loop closures, however, the present invention is not limited to these mechanisms.

Load lifter adjustment straps 110 may be lengthened or shortened by adjusting first adjustment mechanism 140 alone, adjusting second adjustment mechanism 150 alone, or adjusting first adjustment mechanism 140 and second adjustment mechanism 150 in combination. Lengthening or shortening of load lifter adjustment straps 110 permits adjustment of the height of the attached car seat and adjustment of the angle between the attached car seat and the user's back. This allows the user to control where the load feels most comfortable. Adjustment of the load lifter adjustment straps 110 may also be used to control the apparent center of gravity of the attached car seat relative to the user's own center of gravity, thus providing maximum user comfort.

Each second end 112 of load lifter adjustment straps 110 preferably is provided with attachment mechanism 160. Car seats typically are provided with two or more holes or slots in the molded plastic back, through which the car seat shoulder harness straps feed from the back of the car seat to the seat portion, securing the infant or child in the car seat. Attachment mechanism 160 may be any mechanism suitable for anchoring load lifter adjustment straps 110 to a car seat, such that attachment mechanism 160 does not slip out of the car seat slots; for example, a metal tri glide type buckle. Other attachment mechanisms that provide the same functionality are considered to be within the scope of the present invention.

Referring now to FIGS. 1 and 3, carrier apparatus 1 preferably further comprises middle harness system 200. Middle harness system 200 preferably comprises middle attachment strap 210, having first end 211 and second end 212; second releasable attachment mechanism 220; second fixed attachment strap 230, having first end 231 and second end 232; and third adjustment mechanism 240. First end 211 of middle attachment strap 210 preferably is sewn or otherwise attached to carrier body 10. Second end 212 of middle attachment strap 210 preferably is attached to second releasable attachment mechanism 220. Second releasable attachment mechanism 220 preferably is attached to second fixed attachment strap 230, which in turn is threaded through third adjustment mechanism 240. Second releasable attachment mechanism 220 may be any suitable mechanism that permits middle attachment strap 210 to be attached and released without slipping or accidental release. Examples of suitable mechanisms include side release type buckles and hook-and-loop closures, however, the present invention is not limited to these mechanisms.

First end 231 of second fixed attachment strap 230 preferably is sewn or otherwise attached to carrier body 10 as shown in FIG. 3. Second end 232 of second fixed attachment strap 230 preferably is threaded through third adjustment mechanism 240, such that second fixed attachment strap 230 can be lengthened or shortened. Third adjustment mechanism 240 may be any suitable mechanism that permits second fixed attachment strap 230 to be shortened and lengthened without slipping or accidental release. Examples of suitable mechanisms include tri glide type buckles and hook-and-loop closures, however, the present invention is not limited to these mechanisms.

In addition to the shoulder harness strap slots described above, car seats typically are provided with one or more large holes or slots in the molded plastic back, through which the vehicle seat belt may be threaded and attached to the seat belt buckle, thereby securing the car seat in the vehicle. Carrier body 10 preferably is attached to a car seat by threading middle harness system 200 through the seat belt holes or holes.

As embodied herein, carrier body 10 preferably is attached to a car seat by both upper harness system 100 and middle harness system 200. To attach upper harness system 100, load lifter adjustment straps 110 preferably are attached to a car seat by means of attachment mechanism 160. Two attachment mechanisms 160 preferably are inserted through two of the factory-made car seat shoulder harness slots, such that the attachment mechanisms 160 are secure and do not slip out. To attach middle harness system 220, second releasable attachment mechanism 220 is opened, so that middle attachment strap 210 can be threaded through the car seat seat belt hole or holes, and then second releasable attachment mechanism 220 is fastened. Middle harness system 200 may be tightened by the user by pulling either middle attachment strap 210 second end 212 through second releasable attachment mechanism 220, second fixed attachment strap 230 second end 232 through third adjustment mechanism 240, or by a combination of both. The present invention is designed to provide a secure connection between carrier apparatus 1 and a car seat, by means of the adjustability of upper harness system 100 and middle harness system 200.

Figure 9:
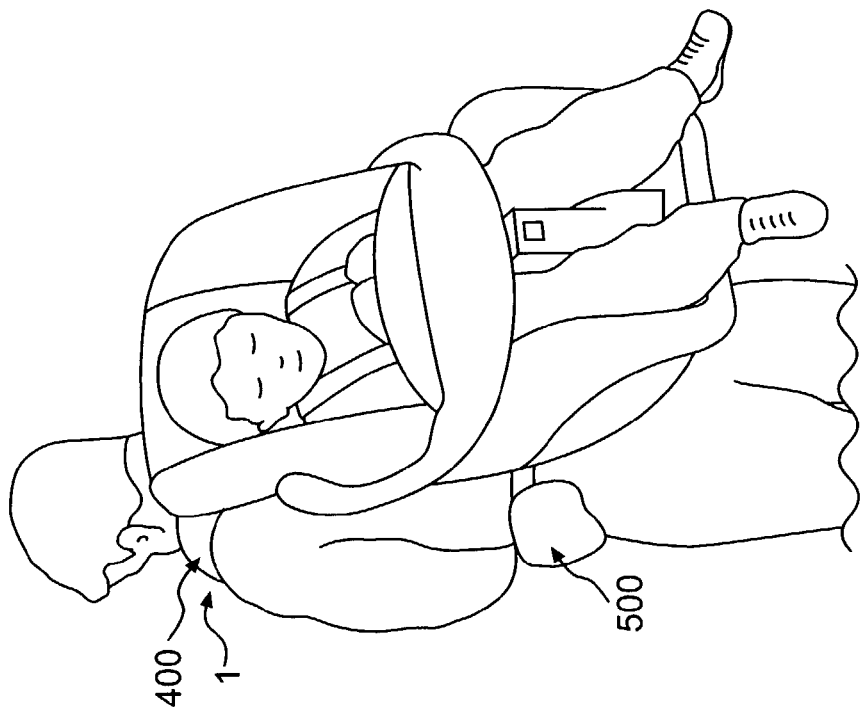
FIG. 9 is a perspective view of a person using the apparatus of the present invention to carry a car seat along with an infant or child buckled in the car seat.

The attachment of carrier apparatus 1, with a car seat attached by upper harness system 100 and middle harness system 200, to the user will now be described. A user carrying a car seat by means of the present invention, with an infant or child secured therein, is shown in FIG. 9. In this illustration, the carrier apparatus is attached to the user's back. It is contemplated by the present invention, however, that the carrier apparatus may also be carried on the user's front or chest, with the car seat facing forward. Carrier apparatus 1 preferably is attached to a user via shoulder harness system 400 together with hip harness system 500.

Referring again to FIG. 1, shoulder harness system 400 preferably further comprises shoulder strap 410, to which shoulder pad 420 is attached. Shoulder pad 420 is intended to provide a cushion from the weight of an attached car seat, or the combined weight of an attached car seat and child. As embodied herein, carrier apparatus 1 preferably comprises two shoulder straps 410, attached symmetrically at upper end 11 of carrier body 10. As shown in FIG. 1, the two shoulder straps 410 are parallel to each other, however the present invention contemplates that shoulder straps 410 could be provided crossing each other. The present invention contemplates other embodiments (not shown) utilizing a single strap mounted on one side of or diagonally across carrier body 10. Other configurations that provide comfort, ease of use, economical manufacture, or other advantages are considered to be within the scope of the present invention.

As embodied herein, each shoulder strap 410 preferably comprises upper end 411 and lower end 412. Shoulder strap 410 may be a fixed length, sewn or otherwise attached to carrier body 10.

Shoulder harness system 400 preferably further comprises chest strap 450, having first end 451 and second end 452. First end 451 preferably is attached to one shoulder strap 410 by means of fourth adjustment mechanism 460, while second end 452 is attached to the other shoulder strap 410 by means of another fourth adjustment mechanism 460. Fourth adjustment mechanism 460 may be any suitable mechanism that permits chest strap 450 to be moved up or down along shoulder strap 410 without slipping or accidental release. Movement of chest strap 450 relative to shoulder strap 410 permits the user to adjust chest strap 450 for maximum upper torso comfort and effectiveness. A preferred example of a suitable mechanism for fourth adjustment mechanism 460 is a sternum strap slider, however, the present invention is not limited to this mechanism.

Chest strap 450 first end 451 and second end 452 further are attached to third releasable attachment mechanism 470, which may be opened by the user to facilitate putting on and taking off carrier apparatus 1. Third releasable attachment mechanism 470 may be any suitable mechanism that permits chest strap 450 to be attached and released without slipping or accidental release. Chest strap 450 first end 451 and second end 452 may also be attached to third releasable attachment mechanism 470 in such a way as to permit adjustment in length of chest strap 450, again to provide maximum upper torso comfort to the user and maximum support of the load carried when using carrier apparatus 1. Examples of suitable mechanisms include side release type buckles and hook-and-loop closures, however, the present invention is not limited to these mechanisms.

Referring now to FIG. 4, shoulder harness system 400 may further comprise upper shoulder harness adjustment strap 430. Upper shoulder harness adjustment strap 430 preferably is a modification of shoulder strap 410 upper end 411, such that upper shoulder harness adjustment strap 430 is threaded through fifth adjustment mechanism 480, and permits easy lengthening and shortening of shoulder strap 410. Fifth adjustment mechanism 480 preferably is attached to upper shoulder harness attachment strap 431. Upper shoulder harness attachment strap 431 may be a fixed length, sewn or otherwise attached to carrier body 10 at upper end 11. Fifth adjustment mechanism 480 may be any suitable mechanism, such as a buckle or hoop-and-loop closure, that permits shoulder strap 410 to be shortened and lengthened without slipping or accidental release, to allow for adjustment to fit any size user. A preferred example of a suitable mechanism is a duck-billed ladder lock type buckle, however, the present invention is not limited to this mechanism.

With continuing reference to FIG. 4, shoulder harness system 400 may further comprise lower shoulder harness adjustment strap 440. Lower shoulder harness adjustment strap 440 preferably is a modification of shoulder strap 410 lower end 412, such that lower shoulder harness adjustment strap 440 is threaded through sixth adjustment mechanism 490, and permits easy lengthening and shortening of shoulder strap 410. Sixth adjustment mechanism 490 preferably is attached to lower shoulder harness attachment strap 441. Lower shoulder harness attachment strap 441 may be a fixed length, sewn or otherwise attached to carrier body 10 at lower end 12. Sixth adjustment mechanism 490 may be any suitable mechanism, such as a buckle or hoop-and-loop closure, that permits shoulder strap 410 to be shortened and lengthened without slipping or accidental release, to allow for adjustment to fit any size user. A preferred example of a suitable mechanism is a duck-billed ladder lock type buckle, however, the present invention is not limited to this mechanism.

Referring again to FIG. 1, carrier apparatus 1 preferably is further attached to user via hip harness system 500. It is contemplated by the present invention, however, that hip harness system 500 may be detachable, and therefore used at the option of the user. Hip harness system 500 preferably further comprises hip belt 510, having first end 511 and second end 512; hip belt adjustment strap 520; and fourth releasable attachment mechanism 530. Hip belt 510 preferably is attached to carrier body 10 at first end 511. First end 511 preferably is sewn or otherwise attached to carrier body 10. Hip belt 510 second end 512 preferably is attached to hip belt adjustment strap 520. Hip belt adjustment strap 520 preferably is threaded (not shown) through fourth releasable attachment mechanism 530 so as to permit adjustment of hip belt 510 to provide maximum comfort and effectiveness for the user. Proper adjustment of hip belt 510 may substantially assist with carrying a heavy load of a car seat plus infant or child. Fourth releasable attachment mechanism 530 may be any suitable mechanism that permits hip belt adjustment strap 520 to be released, fastened, shortened and lengthened without slipping or accidental release. Examples of suitable mechanisms include side release type buckles and hook-and-loop closures, however, the present invention is not limited to these mechanisms.

As embodied herein, carrier body 10 is further provided with internal structures that are designed to increase the stability of carrier body 10, and thereby improve the load-carrying capacity of carrier apparatus 1. Referring now to FIG. 5, carrier body 10 preferably further comprises front panel 14 and back panel 15, which may be sewn, glued, or otherwise attached around the edges, creating a pocket (not shown). Front panel 14 preferably is covered with a mesh aerospacer or similar material, which provides ventilation to the user's back. Carrier body 10 preferably further is provided with an opening (not shown), closable by a zipper (not shown), through which internal structures preferably are inserted into the pocket.

Carrier body 10 preferably further comprises stiffening member 20. Stiffening member 20 may be fabricated from fiberglass or high-density polyethylene plastic. Such materials are well-known and are readily available. Stiffening member 20 preferably is a thin sheet that is shaped to fit inside the pocket created by front panel 14 and back panel 15 of carrier body 10. Stiffening member 20 may extend the length of carrier body 10 from upper end 11 to lower end 12, or may be of any other shape, length or configuration that is desirable for support, comfort, or other purposes. As embodied herein, stiffening member 20 may be inserted through the zippered opening in carrier body 10, and likewise removed.

Figure 6:
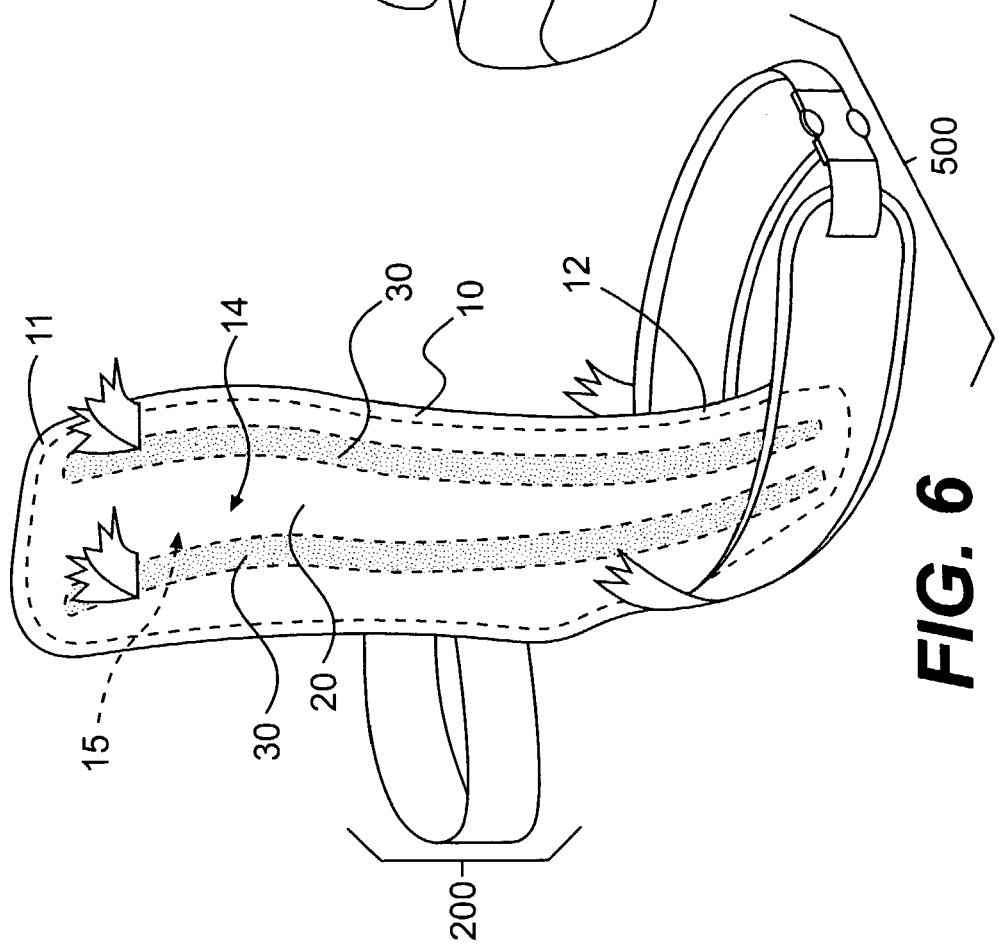
FIG. 6 is a perspective view of an apparatus for carrying a car seat, having internal stays, according to an embodiment of the present invention.

Referring now to FIG. 6, carrier body 10 preferably further comprises at least one stay 30. Stay 30 preferably is a flattened, elongated bar, and may be encased in a plastic covering for ease of handling and insertion. Stay 30 preferably is fabricated from aluminum, however, titanium, steel, or other suitable metal, or plastic or another suitable material may be used. As embodied herein, stay 30 may be inserted into a pouch (not shown) of the same shape as the stay. The pouch may be fabricated from any suitable fabric or material, and may be sewn, glued or otherwise attached to stiffening member 20. Other means of attaching to stiffening member 20 or inserting stay 30 into carrier body 10 are contemplated by and considered to be within the scope of the present invention. As shown in FIG. 6, carrier body 10 is preferably provided with two stays 30, arranged vertically on either side of stiffening member 20, within carrier body 10. Stay 30 may extend the length of carrier body 10 from upper end 11 to lower end 12, or may be of any other shape, length or configuration that is desirable for support, comfort, or other purposes. In combination, stiffening member 20 and stays 30 provide a contoured, semi-rigid body frame. This contoured platform supports the load of the attached car seat, or attached car seat plus infant or child, and serves to distribute the load over a larger area of the user's back. As contemplated by the present invention, the semi-rigid design of carrier body 10 avoids single points of excessive pressure on the user's back.

Figure 8:
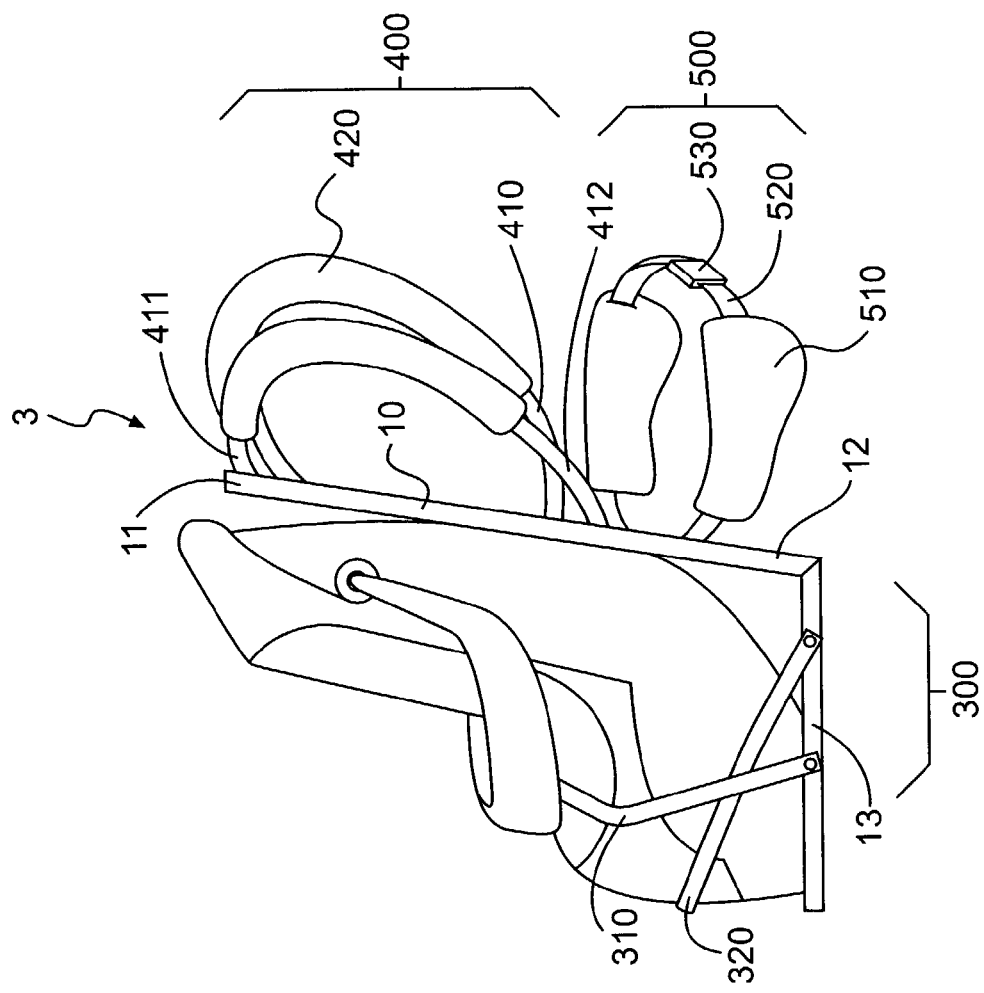
FIG. 8 is a perspective view of an apparatus with a bottom platform for carrying a car seat according to a second alternate embodiment of the present invention.

Referring now to FIG. 8, an alternate embodiment is shown as carrier apparatus 2. Carrier apparatus 2 preferably comprises carrier body 10, shoulder harness system 400 and hip harness system 500. As embodied herein, shoulder harness system 400 further comprises shoulder strap 410, having upper end 411 and lower end 412. Upper end 411 preferably attaches to a car seat through the shoulder harness strap slots typically provided in the back of the car seat. Lower end 412 preferably attaches to a car seat through the seat belt hole or holes typically provided in the back of the car seat. Hip harness system 500 further comprises hip harness attachment strap 501, hip belt 510, hip belt adjustment strap 520 and fourth releasable attachment mechanism 530. Hip belt 510 is also adjustable by means of fourth releasable attachment mechanism 530, to provide maximum comfort and effectiveness for the user. Proper adjustment of hip belt 510 may substantially assist with carrying a heavy load of a car seat plus infant or child. Fourth releasable attachment mechanism 530 may be any suitable mechanism that permits hip belt adjustment strap 520 to be released, fastened, shortened and lengthened without slipping or accidental release. Examples of suitable mechanisms include tri glide type buckles and hook-and-loop closures, however, the present invention is not limited to these mechanisms.

Carrier apparatus 2 is additionally attached to the car seat by means of hip harness attachment strap 501, through the factory-made seat belt hole or holes.

Carrier body 10, having upper end 11 and lower end 12, is attached to a car seat and to shoulder harness system 400 and hip harness system 500 by shoulder strap upper end 411, lower end 412, and hip harness attachment strap 501. As contemplated by the present invention, carrier body 10 may be rigid or semi-rigid to provide support for carrying the car seat, or car seat plus attached child.

One or more adjustment mechanisms and releasable attachment mechanisms (not shown), such as those described above, may also be provided in carrier apparatus 2 to permit adjustment of the various straps for maximum comfort and effectiveness.

Referring now to FIG. 8, an alternate embodiment is shown as carrier apparatus 3. Carrier apparatus 3 preferably comprises carrier body 10, shoulder harness system 400 and hip harness system 500. Carrier apparatus 3 preferably is designed to facilitate attachment of certain models of child or infant car seats that are otherwise difficult to attach to a carrier apparatus of the present invention. Carrier body platform 13 is provided as an attachment area for such car seat models. Platform 13 may be rigid, semi-rigid, or other configurations that allow for attachment of such car seat models. Carrier apparatus 3 preferably further comprises lower harness system 300. Lower harness system 300 preferably further comprises third attachment strap 310 and fourth attachment strap 320. Third and fourth attachment straps 310 and 320 preferably attach a car seat to carrier body platform 13.

As embodied herein, shoulder harness system 400 further comprises shoulder strap 410, having upper end 411 and lower end 412. Upper end 411 preferably attaches to carrier body upper end 11. Shoulder strap lower end 412 preferably attaches to carrier body lower end 10, and may also attach to a car seat through the seat belt hole or holes typically provided in the back of the car seat. Hip harness system 500 further comprises hip harness attachment strap 501, hip belt 510, hip belt adjustment strap 520, and fourth releasable attachment mechanism 530. Hip belt 510 is also adjustable by means of fourth releasable attachment mechanism 530, to provide maximum comfort and effectiveness for the user. Proper adjustment of hip belt 510 may substantially assist with carrying a heavy load of a car seat plus infant or child. Fourth releasable attachment mechanism 530 may be any suitable mechanism that permits hip belt adjustment strap 520 to be released, fastened, shortened and lengthened without slipping or accidental release. Examples of suitable mechanisms include side release type buckles and hook-and-loop closures, however, the present invention is not limited to these mechanisms.

One or more adjustment mechanisms and releasable attachment mechanisms (not shown), such as those described above, may also be provided in carrier apparatus 3 to permit adjustment of the various straps for maximum comfort and effectiveness.

It will be apparent to those skilled in that art that various modifications and variations can be made in the fabrication and configuration of the present invention without departing from the scope and spirit of the invention. For example, one or more of the harness systems described above may be altered as to the number and placement of straps, adjustment mechanisms and attachment mechanisms. Further, the shape and placement of the stiffening member and stays in the carrier body may be altered to achieve desired comfort or load carry capacity objectives. A variety of materials may be used to fabricate the components of the apparatus of the invention. Also, the hip harness system may be detachable.

In addition, one or more of the harness systems or components thereof may be integrated into the factory design of a car seat, rather than being separately purchased as an after-market product. In particular, it may be desirable to manufacture a car seat with the load lifter adjustment straps and attachment mechanism pre-attached to the car seat. In this configuration, the load lifter straps would attach to and detach from the carrier body of the present invention. Thus, it is intended that the present invention cover the modifications and variations of the invention provided they come within the scope of the appended claims and their equivalents.

What is claimed is:

1. An apparatus for carrying a car seat by a person, said apparatus comprising:
   a carrier body having an upper end and a lower end;
   at least one harness system attached to said carrier body, for attaching said carrier body to said car seat and to said person; wherein said at least one harness system further comprises:
   a shoulder harness system attached to said carrier body at said upper end and at said lower end, for securing said apparatus to said person;

a middle harness system attached to said carrier body between said upper end and said lower end, for attaching said carrier body to said car seat;

a hip harness system attached to said carrier body at said lower end, for further securing said apparatus to said person; and an upper harness system attached to said carrier body at said upper end, for further attaching said carrier body to said car seat; wherein said upper harness system further comprises:

at least one load lifter adjustment strap, having a first end and a second end, attached to said carrier body at said upper end, wherein said first end further comprises a first releasable attachment mechanism for attaching to and detaching from said carrier body, and said second end further comprises an attachment mechanism for attaching to said car seat.

2. The apparatus of claim 1, wherein said first end of said at least one load lifter adjustment strap further comprises:

a first fixed attachment strap having a first end and a second end, wherein said first end is attached to said carrier body and to a first adjustment mechanism, and said second end is adjustable by means of said first adjustment mechanism; and a second adjustment mechanism attached to said first end, for adjusting the length of said at least one load lifter adjustment strap.

3. The apparatus of claim 2, wherein said middle harness system further comprises:

a middle attachment strap having a first end and a second end, for attaching said carrier body to said car seat, wherein said first end is attached to said carrier body and said second end is attached to a second releasable attachment mechanism;

a second fixed attachment strap having a first end and a second end, wherein said first end is attached to said carrier body and said second end is attached to a third adjustment mechanism for adjusting the length of said middle harness system and thereby securing said carrier body to said car seat.

4. The apparatus of claim 3, wherein said shoulder harness system further comprises:

at least one shoulder strap having an upper end and a lower end, for securing said apparatus to said person, wherein said upper end is attached to said upper end of said carrier body and said lower end is attached to said lower end of said carrier body; and at least one shoulder pad attached to said at least one shoulder strap.

5. The apparatus of claim 4, wherein said at least one shoulder strap further comprises:

a first shoulder strap having an upper end and a lower end; and a second shoulder strap having an upper end and a lower end.

6. The apparatus of claim 5, wherein said shoulder harness system further comprises:

a chest strap having a first end and a second end, said first end attached to said first shoulder strap between said upper end and said lower end of said first shoulder strap by a first of at least one of a fourth adjustment mechanism, and said second end attached to said second shoulder strap between said upper and said lower end of said second shoulder strap by a second of said at least one fourth adjustment mechanism, wherein said chest strap further comprises said first and second ends attached to a third releasable attachment mechanism;

wherein said chest strap is adjustable along said first and said second shoulder straps by means of said first and said second of said at least one fourth adjustment mechanism;

wherein said chest strap opens and closes by means of said third releasable attachment mechanism;

wherein said upper end of said first shoulder strap further comprises a first upper shoulder harness attachment strap attached to said upper end of said carrier body and to a first of at least one of a fifth adjustment mechanism, and a first upper shoulder harness adjustment strap attached to said first of at least one of a fifth adjustment mechanism and said upper end of said second shoulder strap further comprises a second upper shoulder harness attachment strap attached to said upper end of said carrier body and to a second of said at least one of a fifth adjustment mechanism, and a second upper shoulder harness adjustment strap attached to said second of said at least one of a fifth adjustment mechanism;

wherein said lower end of said first shoulder strap further comprises a first lower shoulder harness attachment strap attached to said lower end of said carrier body and to a first of at least one of a sixth adjustment mechanism, and a first lower shoulder harness adjustment strap attached to said first of said at least one of a sixth adjustment mechanism; and said lower end of said second shoulder strap further comprises a second lower shoulder harness attachment strap attached to said lower end of said carrier body and to a second of said at least one of a sixth adjustment mechanism, and a second lower shoulder harness adjustment strap attached to said second of said at least one of a sixth adjustment mechanism; and wherein the length of said first shoulder strap is adjustable by means of said first upper and said first lower shoulder harness adjustment straps and the length of said second shoulder strap is adjustable by means of said second upper and said second lower shoulder harness adjustment straps.

7. The apparatus of claim 6, wherein said hip harness system further comprises:

a hip belt having a first end and a second end, wherein said first end is attached to said carrier body and said second end is attached to a fourth releasable attachment mechanism, thereby securing said apparatus to said person, wherein said hip belt opens and closes by means of said fourth releasable attachment mechanism; and a hip belt adjustment strap attached to said second end of said hip belt and to said fourth releasable attachment mechanism, for adjusting the length of said hip belt.

8. The apparatus of claim 7, wherein said carrier body further comprises:

a front panel facing toward said person and a back panel facing toward said car seat, wherein said front panel and said back panel are attached to one another to form a pocket;

a stiffening member shaped to fit inside said pocket, for providing support for said carrier body; and at least one semi-rigid stay attached to said stiffening member, for providing additional support for said carrier body.

9. The apparatus of claim 8, wherein said carrier body further comprises:

at least one pouch attached to said stiffening member, having an opening, and wherein said at least one semi-rigid stay is inserted into said opening of said pouch.

10. The apparatus of claim 9, wherein said apparatus is integrated into a factory design of said car seat.

11. The apparatus of claim 9, wherein said apparatus is an after-market product sold separately available for attachment to said car seat.

\* \* \* \* \*